United States Patent
Jain et al.

(10) Patent No.: US 10,003,658 B2
(45) Date of Patent: Jun. 19, 2018

(54) METHOD AND APPARATUS FOR ENABLEMENT OF LOCATION DATA SOURCES DURING EMERGENCY POSITIONING SESSION

(71) Applicant: QUALCOMM Incorporated, San Diego, CA (US)

(72) Inventors: Amit Jain, San Diego, CA (US); Amit Goel, San Diego, CA (US); Govind Ram Venkat Narayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/269,402

(22) Filed: Sep. 19, 2016

(65) Prior Publication Data

US 2018/0084062 A1   Mar. 22, 2018

(51) Int. Cl.
*H04M 11/04* (2006.01)
*H04L 29/08* (2006.01)
*H04W 64/00* (2009.01)
*G01S 5/02* (2010.01)
*H04B 7/00* (2006.01)

(52) U.S. Cl.
CPC .......... *H04L 67/145* (2013.01); *G01S 5/0205* (2013.01); *H04L 67/12* (2013.01); *H04W 4/90* (2018.02); *H04W 64/00* (2013.01)

(58) Field of Classification Search
CPC . G08B 25/016; H04M 11/04; H04M 2242/04; H04W 4/22; H04W 4/02; H04W 64/00; H04W 76/007

USPC ...................................................... 455/404.1
See application file for complete search history.

(56) References Cited

U.S. PATENT DOCUMENTS

| 2005/0118983 A1 | 6/2005 | Van Camp et al. |
| 2009/0069031 A1 | 3/2009 | Burroughs et al. |
| 2010/0048159 A1 | 2/2010 | Stenquist |
| 2011/0111726 A1 | 5/2011 | Kholaif et al. |
| 2011/0212703 A1 | 9/2011 | Gardner et al. |

(Continued)

FOREIGN PATENT DOCUMENTS

RU   2571825 C2   12/2015

OTHER PUBLICATIONS

International Search Report and Written Opinion—PCT/US2017/046738—ISA/EPO—dated Nov. 3, 2017.

*Primary Examiner* — Huy C Ho
(74) *Attorney, Agent, or Firm* — Thien T. Nguyen (57) ABSTRACT

A mobile device is capable of enabling one or more location data sources for location determination of the mobile device. The mobile device may receive a request for an emergency location session, e.g., by a user dialing E911 or from an external client. At least one location data source in the mobile device is determined to be disabled. For example, the location data sources may be a WLAN transceiver or a WPAN transceiver, as well as camera sensors and environmental sensors. The disabled location data source (s) is enabled and location data is obtained from the enabled location data source(s). The location data may be provided, e.g., to a location server. The status of the location data source (s) may be restored, e.g., disabled, after the location data is obtained or after the emergency location session is completed.

30 Claims, 5 Drawing Sheets

(56) References Cited

U.S. PATENT DOCUMENTS

| | | | |
|---|---|---|---|
| 2011/0250864 A1* | 10/2011 | Zussman | G08B 25/016 |
| | | | 455/404.2 |
| 2012/0178410 A1 | 7/2012 | Singhal | |
| 2014/0045450 A1 | 2/2014 | Ballantyne et al. | |
| 2015/0163654 A1* | 6/2015 | Lew | H04W 4/02 |
| | | | 455/404.2 |
| 2016/0057595 A1 | 2/2016 | Ahmed et al. | |
| 2017/0156034 A1 | 6/2017 | Smith | |

* cited by examiner

METHOD AND APPARATUS FOR ENABLEMENT OF LOCATION DATA SOURCES DURING EMERGENCY POSITIONING SESSION

BACKGROUND

Background Field

The subject matter disclosed herein relates to electronic devices, and more particularly to methods and apparatuses for use in determining a location of a mobile device using measurements location data sources in the mobile device.

Relevant Background

During an emergency 911 call initiated with a wireless mobile device, such as a cellular phone, an emergency location session is automatically initiated between a location server and the mobile device. During the emergency location session, positioning transactions occur, such as transferring assistance data, requesting and obtaining location related measurements or a location estimate from the mobile device. Each positioning transaction involves the exchange of one or more messages between the location server and the mobile device.

Location related measurements that are conventionally used to determine position location during an emergency 911 call include Global Navigation Satellite System (GNSS) measurements and cellular base station related measurements, such as Observed Time Difference of Arrival (OTDOA) measurements. With the introduction of LTE Positioning Protocol Extensions (LPPe), various other sensor, as well as non-sensor based measurements may be used to produce location data to aid in location determination. By way of example, wireless local area network (WLAN, e.g., IEEE 802.11 network) measurements, wireless personal area network (WPAN), e.g., Bluetooth® network) measurements, barometric measurements, image based positioning measurements, pedestrian dead reckoning measurements, may all be used as location data to aid in location determinations. The inclusion of additional sensor measurements, especially in indoor conditions, which typically have poor GNSS conditions, provides a significant improvement to location determination accuracy, which is critical during an emergency call.

Many of the location data sources are controlled by software settings determined by user preference. For example, an end user may disable one or more of the location data sources, e.g., for reasons related to power consumption or security. Accordingly, while the location data is useful in improving location determination accuracy, e.g., during emergency situations, the end user may have disabled the sources of the location data. Consequently, in an LPPe based position determination session, no measurements from disabled the location data sources will be reported, possibly degrading the location determination accuracy. Moreover, in areas with poor GNSS and/or cellular base station related measurement conditions, e.g., indoors, the lack of measurements from the location data sources due to the end user disabling the sensors may result in unacceptable location determination in an emergency situation.

SUMMARY

A mobile device is capable of enabling one or more location data sources for location determination of the mobile device. The mobile device may receive a request for an emergency location session, e.g., by a user dialing E911 or from an external client. At least one location data source in the mobile device is determined to be disabled. For example, the location data sources may be a Wireless Local Area Network (WLAN) transceiver and a Wireless Personal Area Network (WPAN) transceiver, as well as camera sensors and environmental sensors. The disabled location data source (s) is enabled and location data is obtained from the enabled location data source(s). The location data may be provided, e.g., to a location server. The status of the location data source (s) may be restored, e.g., disabled, after the location data is obtained or after the emergency location session is completed.

In one implementation, a method of location determination for a mobile device includes receiving a request for an emergency location session for the mobile device; determining that at least one location data source in the mobile device is disabled, wherein the at least one location data source that is disabled comprises at least one of a Wireless Local Area Network (WLAN) transceiver and a Wireless Personal Area Network (WPAN) transceiver; enabling the at least one location data source; obtaining location data from the at least one location data source after the at least one location data source is enabled; and providing the location data from the at least one location data source that is enabled in response to a request for location data during the emergency location session.

In one implementation, a mobile device capable of location determination includes at least one location data source comprising at least one of a Wireless Local Area Network (WLAN) transceiver and a Wireless Personal Area Network (WPAN) transceiver; a wireless transceiver capable of wireless communication with a location server; a processor coupled to the plurality of sensors, the processor being configured to receive a request for an emergency location session, determine that at least one of a plurality of sensors is disabled, wherein the at least one location data source that is disabled comprises the at least one of the WLAN transceiver and the WPAN transceiver, enable the at least one location data source that is disabled; obtain location data from the at least one location data source after the at least one location data source is enabled; and provide the location data from the at least one location data source that is enabled with the wireless transceiver to the location server in response to a request for location data during the emergency location session.

In one implementation, a mobile device capable of location determination includes means for receiving a request for an emergency location session for the mobile device; means for determining that at least one location data source in the mobile device is disabled, wherein the at least one location data source that is disabled comprises at least one of a Wireless Local Area Network (WLAN) transceiver and a Wireless Personal Area Network (WPAN) transceiver; means for enabling the at least one location data source; means for obtaining location data from the at least one location data source after the at least one location data source is enabled; and means for providing the location data from the at least one location data source that is enabled in response to a request for location data during the emergency location session.

In one implementation, a non-transitory computer-readable medium for location determination of a mobile device, the non-transitory computer-readable medium including program code stored thereon that includes program code to receive a request for an emergency location session for the mobile device; program code to determine that at least one location data source in the mobile device is disabled, wherein the at least one location data source that is disabled comprises at least one of a Wireless Local Area Network (WLAN) transceiver and a Wireless Personal Area Network (WPAN) transceiver; program code to enable the at least one location data source; program code to obtain location data from the at least one location data source after the at least one location data source is enabled; and program code to provide the location data from the at least one location data source that is enabled in response to a request for location data during the emergency location session.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
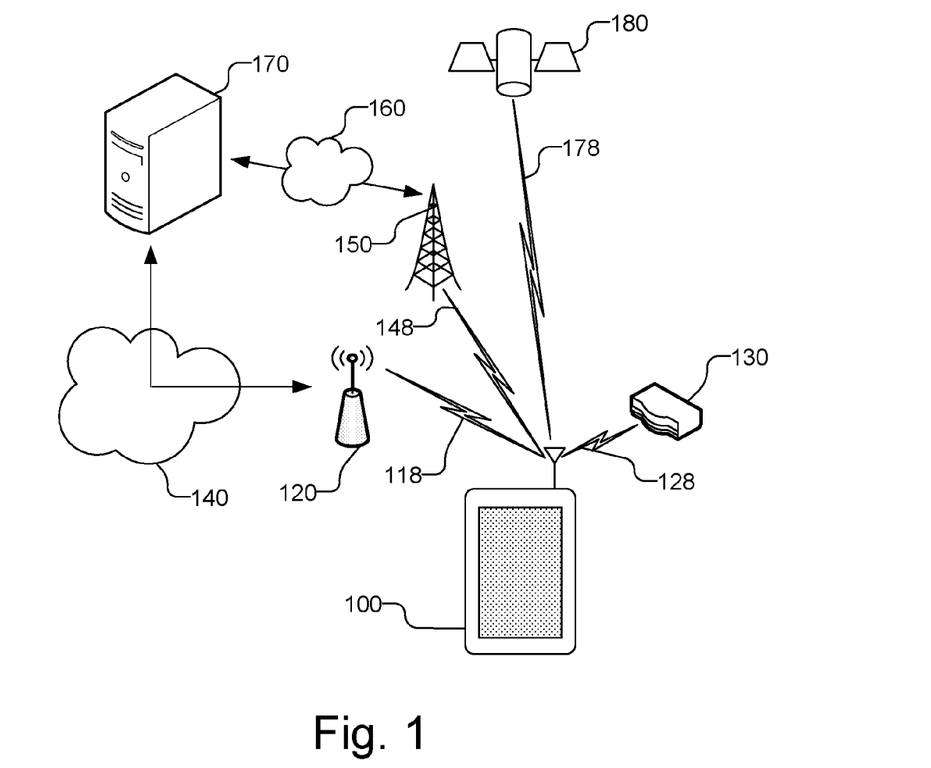
FIG. 1 is a diagram illustrating a network architecture for location support of a mobile device capable of enabling one or more location data sources, such as a wireless local area network (WLAN) transceiver and a wireless personal area network (WPAN) transceiver, for location determination.

FIG. 1 is a diagram illustrating a network architecture for location support of a mobile device 100 that is capable of enabling one or more location data sources. As illustrated, the mobile device 100 is capable of wireless communication over a wireless local area network (WLAN), illustrated by wireless link 118 to local transceiver 120 and a wireless communication link 140, as well as a wireless personal area network (WPAN), illustrated by wireless link 128 to local transceiver 130. The mobile device 100 may further be capable of wireless communication over a cellular communication network by transmitting or receiving wireless signals 148 from a cellular transceiver 150 which may comprise a wireless base transceiver subsystem (BTS), a Node B or an evolved NodeB (eNodeB) over a wireless communication link 160.

The mobile device 100 may be referred to as a device, a wireless device, a mobile terminal, a terminal, a mobile device (MS), a user equipment (UE), a SUPL Enabled Terminal (SET) or by some other name and may correspond to a cellphone, smartphone, laptop, tablet, PDA, tracking device or some other portable or moveable device capable of wireless communication, e.g., over a WLAN network, a WPAN network, and a cellular communication network. The WLAN local transceiver 120, by way of example, may be an access point (AP), a router, a bridge, etc. serving a Wi-Fi or IEEE 802.11 network. The WPAN local transceiver 130 may be, e.g., any short range communication transceiver, such as a Bluetooth transceiver, or a radio-frequency identification (RFID) transceiver, ZigBee, Z-Wave, etc. Examples of cellular network technologies that may support wireless communication link 160 are Global System for Mobile Communications (GSM), Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceiver 150 may comprise deployments of equipment providing subscriber access to a wireless telecommunication network for a service (e.g., under a service contract). Here, a cellular transceiver 150 may perform functions of a cellular base station in servicing subscriber devices within a cell determined based, at least in part, on a range at which the cellular transceiver 150 is capable of providing access service. Of course it should be understood that these are merely examples of networks that may communicate with a mobile device 100, and claimed subject matter is not limited in this respect.

In a particular implementation, the mobile device 100 may communicate with a location server 170 via cellular transceiver 150 over wireless communication link 160. In some implementations, the mobile device 100 may communicate with the location server 170 via local transceivers 120 or over a wireless communication link 140. The network connected to the location server 170 may comprise any combination of wired or wireless links and may include cellular transceiver 150 and/or local transceivers 120 or 130. In a particular implementation, the network between location server 170 and mobile device 100 may be facilitated through an Internet Protocol (IP) or other infrastructure capable of facilitating communication through local transceivers 120, 130 or cellular transceiver 150. In an embodiment, the network between location server 170 and mobile device 100 may also facilitate communication between mobile device 100, location server 170, and a public safety answering point (PSAP). In another implementation, the network between location server 170 and mobile device 100 may comprise cellular communication network infrastructure such as, for example, a base station controller or packet based or circuit based switching center (not shown) to facilitate mobile cellular communication with and mobile device 100.

In a particular implementation, the network between location server 170 and mobile device 100 may comprise local area network (LAN) elements such as Wi-Fi APs, routers and bridges and may in that case include or have links to gateway elements that provide access to wide area networks such as the Internet. In other implementations, the network between location server 170 and mobile device 100 may comprise a LAN and may or may not have access to a wide area network but may not provide any such access (if supported) to mobile device 100. In some implementations the network between location server 170 and mobile device 100 may comprise multiple networks (e.g., one or more wireless networks and/or the Internet). In one implementation, the network between location server 170 and mobile device 100 may include one or more serving gateways or Packet Data Network gateways. In addition, one or more of location servers may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in the network.

In particular implementations, and as discussed below, the mobile device 100 may have circuitry and processing resources capable of obtaining location related measurements, e.g. for signals received from GPS or other Satellite Positioning System (SPS) satellites 180, local transceivers 120, 130, or cellular transceiver 150, and possibly computing a position fix or estimated location based on these location related measurements. The mobile device 100 may be configured to receive information, such as geographic data and/or assistance data during a location session with the location server 170. For example, the location server 170 may be a Secure User Plane Location (SUPL) Location Platform (SLP) and the location session may be a location session according to SUPL service protocol. The location session may further support one or more positioning protocols in order to transfer positioning capability information, assistance data and location measurement or location estimate information between the mobile device 100 and the location server 170. In the case of a SUPL location session, both the SUPL service protocol, known as the User Plane Location Protocol (ULP), and the positioning protocol may be supported in an end to end manner by and between the mobile device 100 and the location server 170 with the ULP protocol carrying the positioning protocol. The positioning protocol may be, for example, LPP or LPP plus LPPe. LPP is defined by 3GPP in 3GPP Technical Specification (TS) 36.355 which is publicly available and LPPe is defined by OMA in OMA TS OMA-TS-LPPe-V1_0 which is publicly available. The location server 170 may be referred to as a server and may be an SLP, a Serving Mobile Location Center (SMLC) defined by 3GPP, a Position Determining Entity (PDE) defined by 3GPP2, a Standalone SMLC (SAS) defined by 3GPP or some other type of server.

In some implementations, location related measurements obtained by the mobile device 100 may be transferred to a location server 170, which may be an enhanced serving mobile location center (E-SMLC) or SUPL location platform (SLP) after which the location server 170 may estimate or determine a location for the mobile device 100 based on the measurements. In the presently illustrated example, location related measurements obtained by the mobile device 100 may include measurements of signals 178 received from satellites 180 belonging to an SPS or Global Navigation Satellite System (GNSS) such as GPS, GLONASS, Galileo or Beidou and/or may include measurements of signals received from terrestrial transmitters fixed at known locations (e.g., such as local transceivers 120, 130 or cellular transceiver 150. Additional measurements from a location data sources, such as from a camera, or environmental sensors, including inertial sensors, motions sensors, pressure sensors (e.g., a barometer), etc., also may be used as location related measurements.

The mobile device 100 or the separate location server 170 may then obtain a location estimate for the mobile device 100 based on the location related measurements using any one of several position methods. For example, when GNSS and/or cellular measurements are available, techniques such as GNSS, Assisted GNSS (A-GNSS), Advanced Forward Link Trilateration (AFLT), Observed Time Difference Of Arrival (OTDOA) or Enhanced Cell ID (E-CID) or combinations thereof may be used. In some of these techniques (e.g. A-GNSS, AFLT and OTDOA), pseudoranges or timing differences may be measured at the mobile device 100 relative to three or more terrestrial transmitters, e.g., 120, 130, or 150, fixed at known locations or relative to four or more satellites with accurately known orbital data, or combinations thereof, based at least in part, on pilots, positioning reference signals (PRS) or other positioning related signals transmitted by the transmitters or satellites and received at the mobile device 100.

Here, location server 170 may be capable of providing positioning assistance data to the mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, location server 170 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, the mobile device 100 may obtain measurements of signal strengths for signals received from cellular transceiver 150 and/or local transceiver 120, 130 and/or may obtain a round trip signal propagation time (RTT) between the mobile device 100 and a cellular transceiver 150 or local transceiver 120, 130. The mobile device 100 may use these measurements together with assistance data (e.g. terrestrial almanac data or GNSS satellite data such as GNSS Almanac and/or GNSS Ephemeris information) received from a location server 170 to determine a location for the mobile device 100 or may transfer the measurements to the location server 170 (or a different server) to perform the same determination. A call from mobile device 100 may be routed, based on the location of the mobile device 100, and connected to a Public Safety Answering Point (PSAP), for example, via wireless communication link 160 or wireless communication link 140.

An estimate of a location of a mobile device 100 may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The mobile device 100 may request a location session, e.g., after a user places an emergency call, e.g., by dialing 911 or sending an SMS text-to-911 message, e.g., via local transceivers 120, 130 or the cellular transceiver 150. The mobile device 100 may further receive a request of a location session, e.g., initiated by an external client. In some implementations, such as operating with LPPe positioning protocol, various location data sources may provide location measurements in addition to the satellites 180 and cellular transceiver 150 measurements that may be used to aid in location determination of the mobile device100. For example, location related measurements may be obtained from at least one of the WLAN local transceiver 120 and the WPAN local transceiver 130 that may be used as location data to aid in location determination of the mobile device 100. By way of example, an identification of the local transceivers with which the mobile device 100 is in communication may be used to provide a position fix based on a prior knowledge of the locations of the local transceiver 120 or 130 and their coverage area. Moreover, measurements such as a received signal strength indicator (RSSI) and/or round trip time (RTT) for signals to/from the local transceivers may be used to further specify a position of the mobile device 100 as a distance from the local transceivers or to trilaterate a position of the mobile device 100 if location related measurements from multiple local transceivers are available. In some implementations, location related measurements from sensors such as a camera or environmental sensors, including inertial sensors, motions sensors, pressure sensors (e.g., a barometer), may be used as location data to aid in location determination. By way of example, a pressure sensor measurements may be used to provide an estimate of elevation or floor that the mobile device 100 may be on. Further captured images from a camera may be used for vision based location determination.

Figure 2:
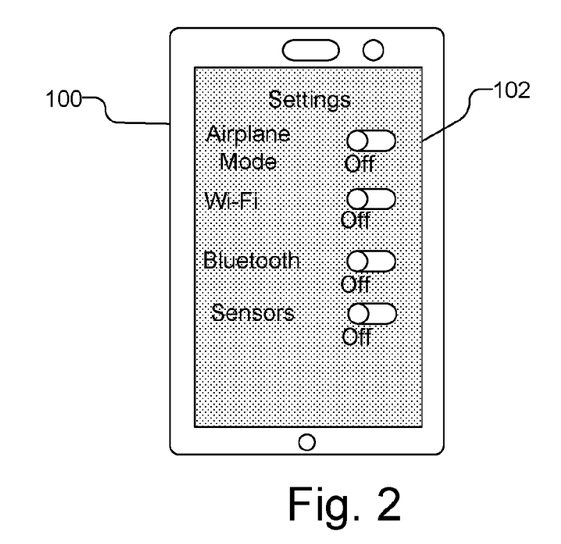
FIG. 2 illustrates a settings display on a mobile device, in which location data sources may be disabled via virtual switches on the touch screen display.

Some location data sources that may be used to generate the location related measurements that may be used as location assistance, however, may be disabled by the end user. For example, FIG. 2 illustrates a settings display on a mobile device 100, in which location data sources, such as the WLAN transceiver, e.g., Wi-Fi, and the WPAN transceiver, e.g., Bluetooth, may be disabled via virtual switches on the touch screen display 102. Other location data sources, such as environmental sensors, e.g., pressure sensor, may also be disabled by the user. As illustrated, location data sources may be disabled individually by a user or may be disabled as a group, e.g., in an airplane mode setting. In some implementations, location data sources may be disabled without user input, e.g., by an application running on the mobile device 100. A user may disable one or more of the location data sources, e.g., for reasons related to power consumption or security.

In operation, once a user has disabled location data sources, e.g., the WLAN and/or WPAN transceivers, if an emergency call is made, e.g., by dialing 911, and an emergency location session initiated, the disabled location data sources conventionally are not enabled. Consequently, in an LPPe based position determination session, no measurements from disabled location data sources will be reported, resulting in a possible degradation of the location determination accuracy.

Figure 3:
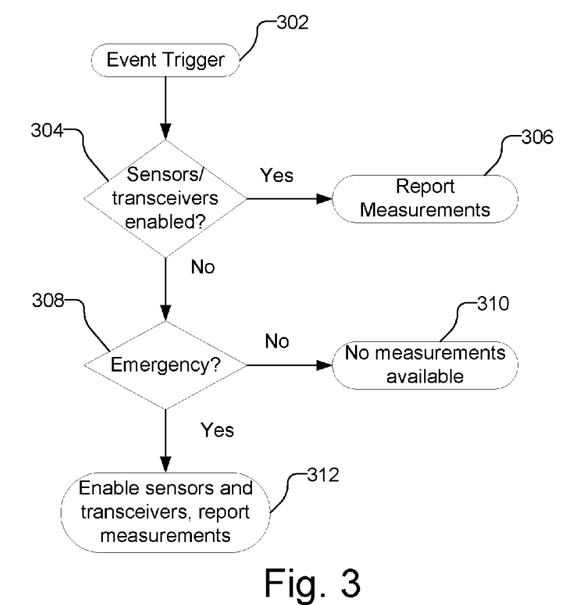
FIG. 3 illustrates a flow chart of enabling location data sources, which may aid in positioning during an emergency location session.

FIG. 3 illustrates a flow chart of enabling location data sources, which may aid in positioning during an emergency location session. As illustrated, after an event trigger occurs (302), a determination is made as to whether the location data sources, e.g., sensors or transceivers, are enabled (304). By way of example, the event trigger may be, such as when an emergency call is made or when an emergency or non-emergency location session is requested. Other trigger events are possible, such as a determining that an emergency event has occurs, such as an automobile crash or an emergency health issue for the end user, which may be determined by user input or sensors. If sensors or transceivers are enabled (304), the location measurements from the enabled sensors or transceivers are performed and reported (306).

If there are location data sources that are not enabled (304), a determination is made as to whether the location session is an emergency location session (308). For example, if the location session was initiated in response to an emergency call from the mobile device 100, the location session may be determined to be an emergency location session. Alternatively, if the location session were initiated from an external client, the emergency location session may be determined based on an indication that the location session is an emergency. If it is determined that the location session is not an emergency (308), the user settings that disabled the one or more location data sources are maintained and no location measurements are available from the disabled sensors or transceivers (310).

If it is determined that the location session is an emergency (308), the disabled location data sources are enabled and the location measurements from the enabled location data sources are performed and reported (312). If desired, the user's settings for the location data sources may be saved prior to enabling the location data sources, and the user's settings may be reinstated after the measurements are obtained or the location session is completed.

Thus, when an emergency call is made or an emergency location session is initiated, existing user settings are overridden and all location data sources are enabled to perform location measurements. The user settings may be overridden, however, without changing the user's preferences, i.e., the settings may be reinstated after the location measurements are obtained or after the location session. Accordingly, a disabled WLAN transceiver, e.g., for Wi-Fi or IEEE 802.11 network, will be enabled during an emergency location session to ensure that location measurements, such as RSSI and RTT, for the WLAN local transceivers 120 are performed. The WLAN measurement may be used to determine a high accuracy position for the mobile device 100, e.g., by the mobile device 100, the location server 170 or a separate server, which may be useful, especially in conditions where there are poor GNSS conditions, e.g., in an indoor environment. Similarly, a disabled WPAN transceiver, e.g., for Bluetooth network or other short range communication network, will be enabled during an emergency location session to ensure that the short range node measurements are reported to the location server 170, which may be useful, e.g., if there are poor GNSS conditions or poor WLAN conditions. Environmental sensors, such as a barometer sensor may also be enabled during an emergency location session to ensure that the altitude is measured and reported to the location server 170, e.g., aiding better location determination in dense urban conditions. Similarly, camera sensors (e.g., front and rear camera sensors) may be enabled to capture images during an emergency location session. The captured images may be used in vision based location determination, which may be useful, e.g., if there are poor GNSS conditions or poor WLAN conditions. Moreover, the enabled camera sensors maybe used to assist in Visual Light communication (VLC) based indoor positioning.

Figure 4:
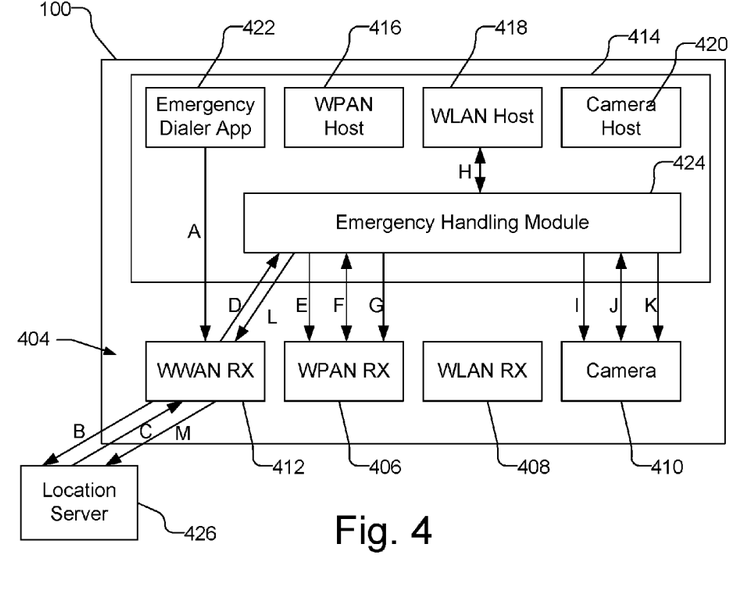
FIG. 4 illustrates a process of enabling location data sources in a mobile device to aid in positioning during an emergency location session.

FIG. 4 illustrates a process of enabling location data sources in a mobile device 100 to aid in positioning during an emergency location session. As illustrated in FIG. 4, the mobile device 100 may include a firmware or hardware section 404, which may include location data sources such as a WPAN (e.g., Bluetooth) transceiver 406, a WLAN (e.g., Wi-Fi) transceiver 408, a camera 410 (which may be both the front and rear cameras), and may additionally include a WWAN (e.g., cellular) transceiver 412. The mobile device 100 may include additional location data sources if desired. The mobile device 100 may further include a high level operating system, illustrated by a processor 414, which may include a WPAN host 416, a WLAN host 418, and a camera host 420, as well as corresponding hosts for any additional location data sources (not shown). Additionally, an emergency dialer application 422 and an emergency handling module 424 may be included in the high level operating system, e.g., processor 414. FIG. 4 further illustrates an external location server 426, which may be, e.g., an LPPe server.

As illustrated by arrows, the emergency dialer application 422 initiates an emergency call (A), e.g., in response to the user placing an emergency call, and the WWAN transceiver 412 contacts the location server 426, (B) e.g., through an appropriate communication link and network, and the emergency call is established (C). The emergency handling module 424, which may be a trusted software built into the operating system, is queried for additional location data (D). The emergency handling module 424 checks the status of the WPAN transceiver 406, determines that it is Off and turns the WPAN transceiver 406 On (E). The emergency handling module 424 obtains location data from the WPAN transceiver 406 (F) and turns the WPAN transceiver 406 Off (G). If desired, the emergency handling module 424 turn the WPAN transceiver 406 to its original status, i.e., Off, after receiving the location data or after the emergency call is terminated.

As illustrated, the emergency handling module 424 may check the status of the WLAN transceiver 408, and determine that it is On, and accordingly, the emergency handling module 424 obtains the location data from the WLAN host 418 (H), and leaves the WLAN transceiver 408 On. If the WLAN transceiver 408 is determined to be Off, the emergency handling module 424 would turn the WLAN transceiver 408 On, obtain location data from the WLAN transceiver 408, and turn the WLAN transceiver 408 back to original state, i.e., Off.

The emergency handling module 424 may check the status of any additional location data sources and, enable if necessary to obtain location data. For example, as illustrated, the emergency handling module 424 may check the status of the camera 410, and determine that it is Off and turn the camera 410 On (I). The emergency handling module 424 may obtain location data from the camera 410 (J), e.g., one or more image frames, and turn the camera 410 Off (K), either after obtaining the location data or after the emergency call is terminated.

The emergency handling module 424 may check the status and obtain location data from any additional location data sources, such as a barometer (not shown in FIG. 4). The location data collected from the various sources by the emergency handling module 424 may be sent together or separately to the WWAN transceiver 412 (L). The WWAN transceiver 412 may forward the location data to the location server 426 (M), e.g., in response to a request for position location data during the emergency location session.

Thus, as can be seen, while sources of location data are enabled to aid in the emergency location session, the user's settings with respect to these sources may not be permanently changed, but merely temporarily overridden for a short duration for emergency positioning purposes. The temporary override of the user's settings may be performed by trusted module, e.g., the emergency handling module 424. The emergency handling module 424, for example, may have special permissions to temporarily change user settings only during an emergency call, and may have no or limited interfaces to provide location related data to any application or other framework in operating system, other than with the transceiver in communication with the location server 426, such as WWAN transceiver 412 as illustrated in FIG. 4 or WLAN transceiver 408, or with an on-board position determination module (not shown). Accordingly, every supported source of location data may be accessed during an emergency call, but the user's settings may not be permanently altered thereby abiding by the user's preferences related to, e.g., power consumption and security.

Figure 5:
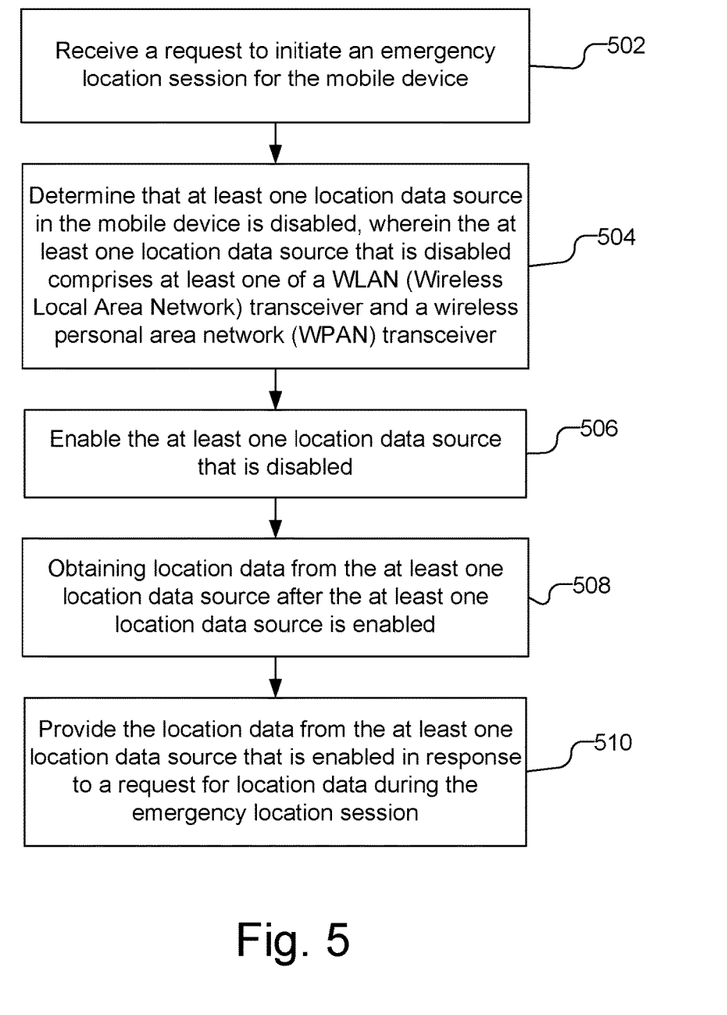
FIG. 5 is a flow chart illustrating a method of enabling one or more location data sources for location determination of a mobile device.

FIG. 5 is a flow chart illustrating a method of enabling one or more location data sources for location determination of a mobile device. As illustrated, a request is received by the mobile device for an emergency location session for the mobile device (502). As discussed above, the request for an emergency location session may be initiated by a user of the mobile device, e.g., by placing an E911 call or sending an SMS text-to-911 message, or by receiving a request from an external client for an emergency location session, or by determining that an emergency event has occur, such as an automobile crash or an emergency health issue for the end user, which requires an emergency location session.

The mobile device determines that at least one location data source in the mobile device is disabled, wherein the at least one location data source that is disabled comprises at least one of a Wireless Local Area Network (WLAN) transceiver and a Wireless Personal Area Network (WPAN) transceiver (504). In one implementation, the at least one location data source may further include at least one additional transceiver or at least one sensor that is capable of being placed in a disabled state. The WLAN transceiver may be a Wi-Fi transceiver, such as an access point, a router, or a bridge serving an IEEE 802.11 network, and the WPAN transceiver may be any short range communication transceiver, such as a Bluetooth transceiver, RFID transceiver, Zigbee transceiver, Z-Wave transceiver etc.

The at least one location data source is enabled (506), and location data is obtained from the at least one location data source after it is enabled (508). By way of example, the location data that is obtained from the at least one location data source may be, e.g., at least one of received signal strength indicator (RSSI) or round trip time (RTT) measurements from the WLAN transceiver or the WPAN transceiver.

The location data from the at least one location data source is provided in response to a request for location data during the emergency location session (510). For example, the request for location data may be from a location server and the response may provide the location data to the location server, e.g., if the location server determines the position of the mobile device 100. Alternatively, if the mobile device 100 determines its position, the location data may be provided to a position determination unit within the mobile device 100 in response to the request, and ultimately, the determined position of the mobile device may be transmitted to the location server. Additionally, location data may also be obtained from any location data source that was not determined to be disabled, and the location data obtained from the any location data source that was not determined to be disabled also may be provided in response to the request for location data during the emergency location session.

Figure 6:
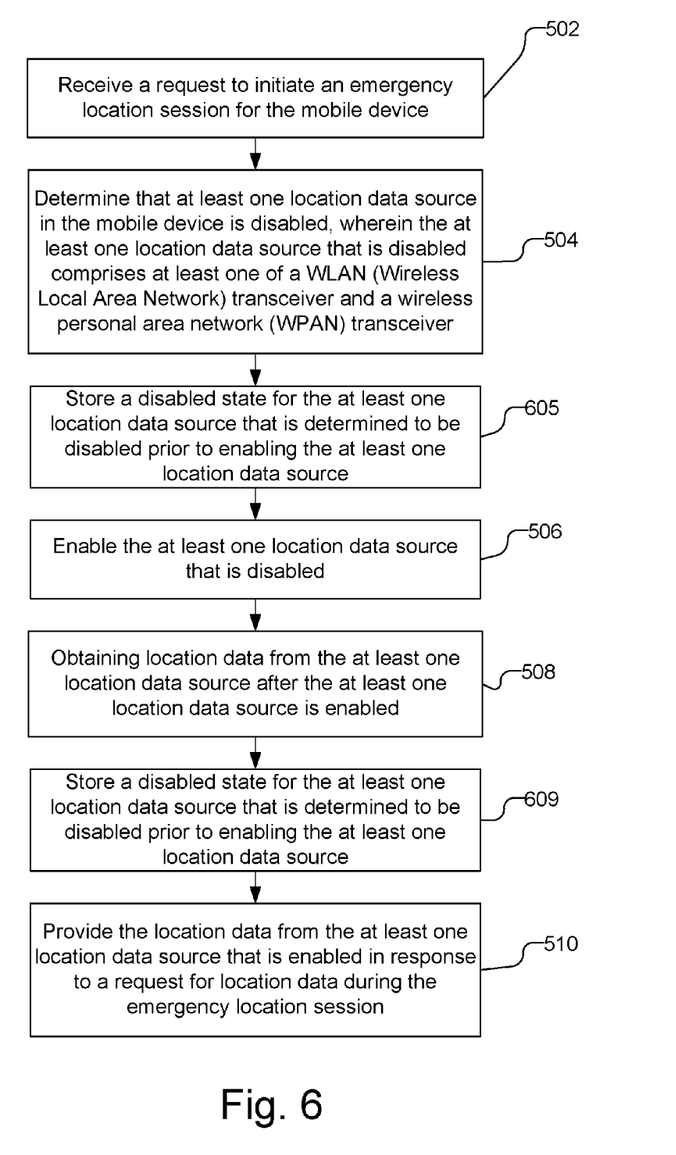
FIG. 6 is a flow chart illustrating another method of enabling one or more location data sources for location determination of a mobile device.

FIG. 6 is a flow chart illustrating a method of enabling one or more location data sources for location determination of a mobile device similar to that shown in FIG. 5, like designated elements being the same. In addition, however, a disabled state for the at least one location data source that is determined to be disabled may be stored prior to enabling the at least one location data source (605). Additionally, the at least one location data source is disabled after obtaining the location data (609) as per the stored disabled state. By way of example, the at least one location data source may be disabled immediately after the location data is obtained or the at least one location data source may be disabled after the emergency location session is terminated.

Figure 7:
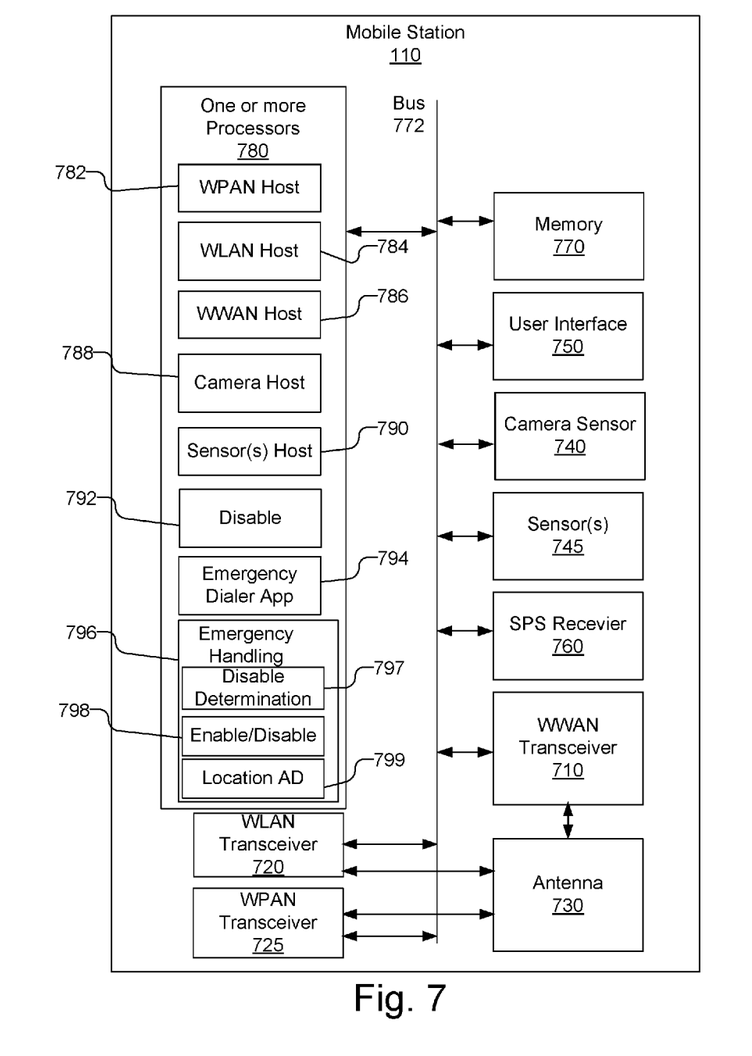
FIG. 7 is a block diagram of a mobile device capable of enabling one or more location data sources for location determination.

FIG. 7 is a block diagram of a mobile device 100 capable of enabling one or more location data sources for location determination. The mobile device 100 may include one or more location data sources, including a WLAN transceiver 720 to wirelessly communicate with WLAN transmitters, such as at least one of a local transceiver 120 (shown in FIG. 1), and a WPAN transceiver 725 to wirelessly communicate with local transceivers 130 (shown in FIG. 1) using short range short range communication technology. The mobile device 100 may include additional location data sources, camera sensors 740, which may include the front and rear cameras, and/or one or more environmental sensors 745, such as a pressure sensor (barometer), or sensors such as a microphone, temperature sensor, humidity sensor, radiation sensor etc. The mobile device 100 further includes a WWAN transceiver 710 to wirelessly communicate with WWAN transmitters, such as cellular transceiver 150 (shown in FIG. 1) to communicate with, e.g., the location server 170 (shown in FIG. 1) in some embodiments. The mobile device 100 may include one or more antennas 730 that may be used with the WWAN transceiver 710, WLAN transceiver 720 and WPAN transceiver 725. The mobile device 100 may further include an SPS receiver 760 for receiving SPS data from satellites 180 (shown in FIG. 1). The mobile device 100 may further include a user interface 750 that may include e.g., a display, a keypad or other input device, such as virtual keypad on the display, through which a user may interface with the mobile device 100.

The mobile device 100 further includes a memory 770 and one or more processors 780, which may be coupled together with bus 772. The one or more processors 780 and other components of the mobile device 100 may similarly be coupled together with bus 772, a separate bus, or may be directly connected together or a combination of the foregoing. The memory 770 may contain executable code or software instructions that when executed by the one or more processors 780 cause the one or more processors to operate as a special purpose computer programmed to perform the algorithms disclosed herein.

As illustrated in FIG. 7, the one or more processors 780 may include one or more processing units or components that implement the methodologies as described herein. For example, the mobile device 100 may include a WPAN host 782, a WLAN host 784, and a WWAN host 786, which receive signals from the WPAN transceiver 725, WLAN transceiver 720, and WWAN transceiver 710, respectively, when these transceivers are enabled. The mobile device 100 may further include a camera host 788 and a sensor host 790, which receive signals from the camera sensors 740 and the environmental sensors 745, respectively, when enabled. The one or more processors 780 may further include a disable unit 792 that communicates with the user interface 750 and disables one or more of the location data sources, e.g., WLAN transceiver 720, WPAN transceiver 725, camera sensors 740, and environmental sensors 745, individually or together (e.g., in airplane mode), in response to a user's selection. The one or more processors 780 further includes an emergency dialer application 794, which initiates an emergency call, e.g., in response to a user placing an E911 call or sending an SMS text-to-911 message via the user interface 750.

The one or more processors 780 further includes an emergency handling module 796, which checks the status of the location data sources and determines whether they are enabled or disabled. As illustrated, the emergency handling module 796 includes a disable determination module 797 that determines whether any location data sources are disabled when there is a request for an emergency call. An enable/disable module 798 in the emergency handling module 796 enables any location data sources that are disabled, and will disable these location data sources after the location data is obtained, e.g., immediately after obtaining the location data or after the emergency call is completed. By way of example, the enable/disable module 798 may store the status of location data sources and then restores the location data sources as per the stored status. The emergency handling module 796 may further include a location data module 799 that obtains the location data, e.g., directly from the location data source if the enable/disable module 798 enabled the location data source, or from the corresponding host of the location data source if the location data source was already enabled. The location data module 799 may forward the location data to the wireless transceiver, e.g., the WWAN transceiver 710, for transmission to the location server.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 770, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The mobile device 100 includes a means for means for receiving a request for an emergency location session for the mobile device, which may include, e.g., the emergency dialer application 794 may receive a user initiated emergency call via the user interface or may be, e.g., the WWAN transceiver 710 if the if the emergency location session is initiated from an external client. The mobile device 100 includes a means for determining that at least one location data source in the mobile device is disabled, wherein the at least one location data source that is disabled comprises at least one of a Wireless Local Area Network (WLAN) transceiver and a Wireless Personal Area Network (WPAN) transceiver, which may include, e.g., the disable determination module 797 in the emergency handling module 796. The mobile device 100 includes a means for enabling the at least one location data source, which may include the enable/disable module 798 in the emergency handling module 796. The mobile device 100 includes a means for obtaining location data from the at least one location data source after the at least one location data source is enabled, which may include, e.g., the location data module 799 in the emergency handling module 796, as well as, e.g., the WLAN transceiver 720 and WPAN transceiver 725. The mobile device 100 includes a means for providing the location data from the at least one location data source that is enabled in response to a request for location data during the emergency location session, which may include, e.g., the location data module 799 in the emergency handling module 796, as well as, e.g., the wireless transceiver in communication with the location server, such as the WWAN transceiver 710.

The mobile device 100 may further include a means for obtaining location data from any location data source that was not determined to be disabled, which may include, e.g., the location data module 799 in the emergency handling module 796, as well as host corresponding to the location data source, such as WPAN host 782, WLAN host 784, camera host 788, or environmental sensor(s) host 790. A means for providing the location data from the location data source that was not disabled in response to the request for location data during the emergency location session, may include, e.g., the location data module 799 in the emergency handling module 796, as well as, e.g., the wireless transceiver in communication with the location server, such as the WWAN transceiver 710.

The mobile device 100 may further include a means for storing a disabled state for the at least one location data source that is determined to be disabled prior to enabling the at least one location data source, which may include, e.g., the enable/disable module 798 in the emergency handling module 796. A means for disabling the at least one location data source after obtaining the location data, may include, e.g., the enable/disable module 798 in the emergency handling module 796.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of location determination for a mobile device, the method comprising:
    receiving a request for an emergency location session for the mobile device;
    determining that at least one location data source in the mobile device is disabled, wherein the at least one location data source that is disabled comprises at least one of a Wireless Local Area Network (WLAN) transceiver or a Wireless Personal Area Network (WPAN) transceiver or a combination thereof;
    enabling the at least one location data source in response to receiving the request for the emergency location session and determining that the at least one location data source in the mobile device is disabled;
    obtaining location data from the at least one location data source after the at least one location data source is enabled; and
    providing the location data from the at least one location data source that is enabled in response to a request for location data during the emergency location session.

2. The method of claim 1, further comprising:
    obtaining location data from any location data source that was not determined to be disabled; and
    providing the location data from the any location data source that was not disabled in response to the request for location data during the emergency location session.

3. The method of claim 1, further comprising:
    storing a disabled state for the at least one location data source that is determined to be disabled prior to enabling the at least one location data source; and
    disabling the at least one location data source after obtaining the location data.

4. The method of claim 1, wherein the at least one location data source further comprises at least one additional transceiver or at least one sensor in the mobile device that is capable of being placed in a disabled state.

5. The method of claim 1, wherein the WLAN transceiver comprises a Wi-Fi transceiver.

6. The method of claim 1, wherein the WPAN transceiver comprises a Bluetooth transceiver.

7. The method of claim 1, wherein the location data obtained from the at least one location data source that is enabled comprises at least one of received signal strength indicator (RSSI) or round trip time (RTT) measurements or a combination thereof from the at least one of the WLAN transceiver or the WPAN transceiver or the combination thereof.

8. The method of claim 1, wherein the request to initiate the emergency location session for the mobile device comprises an emergency cal initiated by a user of the mobile device.

9. A mobile device capable of location determination, the mobile device comprising:
    at least one location data source comprising at least one of a Wireless Local Area Network (WLAN) transceiver or a Wireless Personal Area Network (WPAN) transceiver or a combination thereof;
    a wireless transceiver capable of wireless communication with a location server;
    a processor coupled to the at least one data source and the wireless transceiver, the processor being configured to receive a request for an emergency location session, determine that the at least one location data source is disabled, wherein the at least one location data source that is disabled comprises the at least one of the WLAN transceiver or the WPAN transceiver or the combination thereof enable the at least one location data source that is disabled in response to receiving the request for the emergency location session and determining that the at least one location data source in the mobile device is disabled; obtain location data from the at least one location data source after the at least one location data source is enabled; and provide the location data from the at least one location data source in response to a request for location data during the emergency location session.

10. The mobile device of claim 9, wherein the processor of further configured to obtain location data from any location data source that was not determined to be disabled and the location data from the location data source that was not disabled in response to the request for location data during the emergency location session.

11. The mobile device of claim 9, wherein the processor of further configured to store a disabled state for the at least one location data source that is determined to be disabled prior to enabling the at least one location data source, and disable the at least one location data source after obtaining the location data.

12. The mobile device of claim 9, wherein the at least one location data source further comprises at least one additional transceiver or at least one sensor in the mobile device that is capable of being placed in a disabled state.

13. The mobile device of claim 9, wherein the WLAN transceiver comprises a Wi-Fi transceiver.

14. The mobile device of claim 9, wherein the WPAN transceiver comprises a Bluetooth transceiver.

15. The mobile device of claim 9, wherein the processor is configured to obtain location data with the at least one location data source that is enabled by being configured to obtain at least one of received signal strength indicator (RSSI) or round trip time (RTT) measurements or a combination thereof from the at least one of the WLAN transceiver or the WPAN transceiver or the combination thereof.

16. The mobile device of claim 9, wherein the request to initiate the emergency location session comprises an emergency cal initiated by a user of the mobile device.

17. A mobile device capable of location determination, the mobile device comprising:
means for receiving a request for an emergency location session for the mobile device;
means for determining that at least one location data source in the mobile device is disabled, wherein the at least one location data source that is disabled comprises at least one of a Wireless Local Area Network (WLAN) transceiver or a Wireless Personal Area Network (WPAN) transceiver or a combination thereof;
means for enabling the at least one location data source in response to receiving the request for the emergency location session and determining that the at least one location data source in the mobile device is disabled;
means for obtaining location data from the at least one location data source after the at least one location data source is enabled; and
means for providing the location data from the at least one location data source that is enabled in response to a request for location data during the emergency location session.

18. The mobile device of claim 17, further comprising:
means for obtaining location data from any location data source that was not determined to be disabled; and
means for providing the location data from the location data source that was not disabled in response to the request for location data during the emergency location session.

19. The mobile device of claim 17, further comprising:
means for storing a disabled state for the at least one location data source that s determined to be disabled prior to enabling the at least one location data source; and
means for disabling the at least one location data source after obtaining the location data.

20. The mobile device of claim 17, wherein the at least one location data source further comprises at least one additional transceiver or at least one sensor in the mobile device that is capable of being placed in a disabled state.

21. The mobile device of claim 17, wherein the WLAN transceiver comprises a W-Fi transceiver and the WPAN transceiver comprises a Bluetooth transceiver.

22. The mobile device of claim 17, wherein the location data obtained from the at least one location data source that is enabled comprises at least one of received signal strength indicator (RSSI) or round trip time (RTT) measurements or a combination thereof from the at least one of the WLAN transceiver or the WPAN transceiver or the combination thereof.

23. The mobile device of claim 17, wherein the request to initiate the emergency location session for the mobile device comprises an emergency call initiated by a user of the mobile device.

24. A non-transitory computer-readable medium for location determination of a mobile device, the non-transitory computer-readable medium including program code stored thereon, comprising:
program code to receive a request for an emergency location session for the mobile device;
program code to determine that at least one location data source in the mobile device is disabled, wherein the at least one location data source that is disabled comprises at least one of a Wireless Local Area Network (WLAN) transceiver or a Wireless Personal Area Network (WPAN) transceiver or a combination thereof;
program code to enable the at least one location data source in response to receiving the request for the emergency location session and determining that the at least one location data source in the mobile device is disabled;
program code to obtain location data from the at least one location data source after the at least one location data source is enabled; and
program code to provide the location data from the at least one location data source that is enabled in response to a request for location data during the emergency location session.

25. The non-transitory computer-readable medium of claim 24, further comprising:
program code to obtain location data from any location data source that was not determined to be disabled; and
program code to provide the location data from the location data source that was not disabled in response to the request for location data during the emergency location session.

26. The non-transitory computer-readable medium of claim 24, further comprising:
program code to store a disabled state for the at least one location data source that is determined to be disabled prior to enabling the at least one location data source; and
program code to disable the at least one location data source after obtaining the location data.

27. The non-transitory computer-readable medium of claim 24, wherein the at least one location data source further comprises at least one additional transceiver or at least one sensor in the mobile device that is capable of being placed in a disabled state.

28. The non-transitory computer-readable median of claim 24, wherein the WLAN transceiver comprises a Wi-Fi transceiver and the WPAN transceiver comprises a Bluetooth transceiver.

29. The non-transitory computer-readable median of claim 24, wherein the location data obtained from the at least one location data source that is enabled comprises at least one of received signal strength indicator (RSSI) or round trip time (RT) measurements or a combination thereof from the at least one of the WLAN transceiver or the WPAN transceiver or a combination thereof.

30. The non-transitory computer-readable medium of claim 24, wherein the request to initiate the emergency location session for the mobile device an emergency call initiated by a user of the mobile device.

* * * * *

UNITED STATES PATENT AND TRADEMARK OFFICE
CERTIFICATE OF CORRECTION

PATENT NO. : 10,003,658 B2
APPLICATION NO. : 15/269402
DATED : June 19, 2018
INVENTOR(S) : Amit Jain, Amit Goel and Govind Ram Venkat Narayan Page 1 of 1

It is certified that error appears in the above-identified patent and that said Letters Patent is hereby corrected as shown below:

In the Claims

In Column 16, Line 23, in Claim 8, delete "cal" and insert --call--.

In Column 17, Line 12, in Claim 16, delete "cal" and insert --call--.

In Column 17, Line 53, in Claim 17, delete "W-Fi" and insert --Wi-Fi--.

In Column 18, Line 49, in Claim 28, delete "median" and insert --medium--.

In Column 18, Line 53, in Claim 29, delete "median" and insert --medium--.

In Column 18, Line 57, in Claim 29, delete "(RT)" and insert --(RTT)--.

Signed and Sealed this
Seventeenth Day of December, 2019

Andrei Iancu
*Director of the United States Patent and Trademark Office*